US012089005B2

(12) United States Patent
Guo et al.

(10) Patent No.: US 12,089,005 B2
(45) Date of Patent: Sep. 10, 2024

(54) HEARING AID COMPRISING AN OPEN LOOP GAIN ESTIMATOR

(71) Applicant: Oticon A/S, Smørum (DK)

(72) Inventors: Meng Guo, Smørum (DK); Anders Meng, Smørum (DK); Martin Kuriger, Fribourg (CH); Mojtaba Farmani, Smørum (DK); Mikkel Grønbech, Smørum (DK); Sudershan Y.S, Smørum (DK)

(73) Assignee: Oticon A/S, Smørum (DK)

( * ) Notice: Subject to any disclaimer, the term of this patent is extended or adjusted under 35 U.S.C. 154(b) by 209 days.

(21) Appl. No.: 17/674,041

(22) Filed: Feb. 17, 2022

(65) Prior Publication Data

US 2022/0264232 A1 Aug. 18, 2022

(30) Foreign Application Priority Data

Feb. 18, 2021 (EP) .................................... 21157775

(51) Int. Cl.
*H04R 25/00* (2006.01)

(52) U.S. Cl.
CPC ......... *H04R 25/453* (2013.01); *H04R 25/505* (2013.01)

(58) Field of Classification Search
CPC .. H04R 25/453; H04R 25/505; H04R 25/554; H04R 25/305; H04R 2460/15; H04R 25/558
See application file for complete search history.

(56) References Cited

U.S. PATENT DOCUMENTS

2013/0170660 A1 7/2013 Kristensen et al.

FOREIGN PATENT DOCUMENTS

EP 2 613 567 A1 7/2013
WO WO 2009/007245 A1 1/2009

OTHER PUBLICATIONS

Extended European Search Report, issued in Priority Application No. 21157775.4, dated Aug. 11, 2021.

*Primary Examiner* — Tuan D Nguyen
(74) *Attorney, Agent, or Firm* — Birch, Stewart, Kolasch & Birch, LLP

(57) ABSTRACT

A hearing aid comprises a forward path comprising an input transducer an electric input signals representing a sound comprising target signal components and background noise, a hearing aid processor for providing a processed signal in dependence of said at least one electric input signal and for providing a processed output signal in dependence thereof, and an output transducer for providing stimuli perceivable as sound to the user in dependence of said processed signal. The forward path provides a frequency dependent intended forward path transfer function. The hearing aid further comprises a feedback path estimator configured to provide a current frequency dependent estimate of a feedback path transfer function of a feedback path from the output transducer to the input transducer, and a current feedback path estimate in dependence of the current estimate of the feedback path transfer function and of the processed signal, and a combination unit in the forward path configured to subtract the current feedback path estimate from a signal of the forward path to provide a feedback corrected signal. The hearing aid may further comprise a noise estimator configured to provide a current frequency dependent noise estimate representing a background noise level in the at least one electric input signal, an open loop transfer function estimator configured to provide a frequency dependent estimate of a current open loop transfer function in dependence of the intended forward path transfer function and the current estimate of the feedback transfer function, and a confidence level estimator configured to provide a current frequency dependent estimate of a confidence level of the (Continued)

current estimate of the feedback transfer function in dependence of a current estimate of open loop gain and optionally the current noise estimate. The hearing aid may be configured to control processing in the hearing aid in a frequency band k in dependence of said current estimate of the open loop transfer function and/or the current estimate of the feedback path transfer function, if the current estimate of the confidence level fulfils a confidence criterion in said frequency band k. A method of operating a hearing aid is further disclosed. The invention may e.g. be used to assess a risk of acoustic feedback in a hearing aid.

21 Claims, 4 Drawing Sheets

HEARING AID COMPRISING AN OPEN LOOP GAIN ESTIMATOR

TECHNICAL FIELD

The present disclosure relates to hearing aids. The behaviour of a closed-loop system, e.g. a hearing aid, depends on the open loop transfer function, and especially on the magnitude of the open loop transfer function (also referred to as the open loop gain). In practice, when the open loop gain is too high, the hearing aid becomes unstable.

SUMMARY

In the present disclosure, a procedure/algorithm to estimate/monitor the open loop transfer function in a hearing aid system based on its acoustic feedback cancellation system using adaptive filters is described.

According to the present disclosure, it is proposed to use an estimate of the current open loop transfer function (or its absolute value, the open loop gain) to classify the current (closed loop) feedback estimate (e.g. to decide a degree of accuracy or reliability of the current feedback estimate). According to the present disclosure, the classification of the current (closed loop) feedback estimate can be based solely on the estimate of the open loop transfer function (without the use of additional detectors). The classification of the current feedback estimate can be based solely on the estimate of the open loop transfer function and an estimate of a current background noise level.

The open loop transfer function (OLTF) of a hearing aid at a given point in time may be determined as a sum of a forward path transfer function (FPTF) (from input to output of the hearing aid) and a feedback path transfer function (FBPTF) (from output to input of the hearing aid), i.e. OLTF=FPTF+FBPTF, (in a logarithmic representation). The open loop transfer function (as well as the forward path transfer function and the feedback path transfer function) is typically time- and frequency-dependent (and in the following typically denoted $L(k, l)$, where k is a frequency index and l is a time index, or $\hat{L}(k, l)$, when an estimate of the open loop transfer function is indicated). The open loop transfer function may be approximated by the parameter open loop gain, which is the numerical value of the generally complex open loop transfer function. The, hence real-valued, (e.g. time- and frequency-dependent) open loop gain is in the following denoted $|L(k, l)|$, or $|\hat{L}(k, l)|$, when an estimate of the open loop gain is indicated.

The open loop transfer function estimate can be used for several applications, including control of hearing aids based on feedback risks and detection of correct placement of ear moulds, etc.

A Hearing Aid:

In an aspect of the present application, a hearing aid adapted to be worn by a user, or for being partially or fully implanted in the head of the user, is provided.

The hearing aid comprises a forward path comprising
- at least one input transducer for converting a sound to corresponding at least one electric input signals representing the sound, the sound comprising target signal components and background noise,
- a hearing aid processor for providing a processed signal in dependence of the at least one electric input signal, and
- an output transducer for providing stimuli perceivable as sound to the user in dependence of the processed signal, The forward path may be configured to provide a frequency dependent intended forward path transfer function from the input transducer to the output transducer in dependence of the at least one electric input signal and of the user (e.g. a hearing ability of the user), k being a frequency band index. The forward path transfer function may be configured to compensate for a hearing impairment of the user, e.g. by applying a frequency and level dependent gain to the at least one electric input signal or to a signal originating therefrom.

The hearing aid further comprises
- a feedback control system comprising
  - a feedback path estimator configured to provide
    - a current frequency dependent estimate of a (closed loop) feedback path transfer function of a feedback path from the output transducer to the input transducer in a closed loop configuration of the forward path, and
    - a current feedback path estimate in dependence of the current estimate of the feedback path transfer function and of the processed signal,
  - a combination unit in the forward path configured to subtract the current feedback path estimate from a signal of the forward path to provide a feedback corrected signal.

The hearing aid may further comprise
- an open loop transfer function estimator configured to provide a frequency dependent estimate of a current open loop transfer function in dependence of the intended forward path transfer function and the current estimate of the feedback transfer function, and
- a confidence level estimator configured to provide a current frequency dependent estimate of a confidence level of the current estimate of the (closed loop) feedback transfer function in dependence of the estimate of the current open loop transfer function (e.g. the open loop gain).

The hearing aid may further comprise
- a noise estimator configured to provide a current frequency dependent noise estimate representing the background noise in the at least one electric input signal, and
- the confidence level estimator may be configured to provide a current frequency dependent estimate of a confidence level of the current estimate of the (closed loop) feedback transfer function in dependence of the estimate of the current open loop transfer function (e.g. the current open loop gain) and the current noise estimate.

The term 'the (or an) estimate of the (or a) current open loop transfer function' is in the present disclosure used interchangeably with the term 'the (or a) current estimate of the (or an) open loop transfer function' without any intended difference in interpretation. The same is the case for similar expressions regarding current estimates of 'noise', or 'feedback path transfer functions', etc.

The hearing aid may be configured to control processing in the hearing aid in a frequency band k in dependence of the current estimate of the open loop transfer function and/or the current estimate of the feedback path transfer function, if the current estimate of the confidence level fulfils a confidence criterion in the frequency band k. The control of processing in the hearing aid in a frequency band k may be dependent on the current estimate of the open loop transfer function and/or the current estimate of the feedback path transfer function solely in the given frequency band k (or it may be dependent on values of said parameter(s) in the given frequency band k and one or more adjacent (e.g. neighboring) frequency bands).

The 'control of processing in the hearing aid' may e.g. comprise changing the frequency dependent intended forward path transfer function, e.g. to control feedback. The 'control of processing in the hearing aid' may e.g. comprise changing a parameter of the feedback control system, e.g. an adaptation rate of an adaptive algorithm of the feedback control system.

The hearing aid may comprise a time domain to time-frequency domain conversion unit (e.g. a filter bank, e.g. comprising a Fourier transform algorithm) for providing a time-frequency representation (k, l) of an input signal, e.g. of the at least one electric input signal, where k and l are frequency and time indices, respectively.

Thereby an improved processing of a hearing aid may be provided. In an embodiment, an improved fast feedback indicator may thereby be provided.

The background noise is not necessarily pure noise. Speech components of the acoustic input signal may also be considered as noise in this context.

In an open loop estimation with probe noise, the acoustic input signal ($S_x$, cf. e.g. FIG. 5) acts as a background noise and it disturbs the estimation, especially if the signal level is high, despite that this signal can contain otherwise desired speech/music signals. Hence, we refer to this input signal ($S_x$) as background noise for the adaptive filter estimation.

In a closed loop estimation without probe noise, the estimation must rely on that there is an acoustic input signal ($S_x$) to have an acoustic output signal (O) at all. Still, this acoustic input signal ($S_x$) can disturb the estimation, especially for low loop gains but less so for high loop gains. Hence, also in this case we refer to this signal as background noise for the adaptive filter estimation.

The estimate of a confidence level may be a binary parameter (e.g. taking on two values, e.g. TRUE or FALSE, or 1 or 0, etc.), see e.g. FIG. 1, 2. The confidence level may be a (continuous), e.g. probabilistic parameter, e.g. taking on values between 0 and 1.

The dependency of the frequency dependent intended forward path transfer function from the input transducer to the output transducer on the user may e.g. be related to the user's hearing ability, e.g. a hearing impairment. The forward path (e.g. the hearing aid processor) may comprise a compressor for applying a frequency and/or level dependent gain (amplification or attenuation) to a signal of the forward path to compensate for the user's hearing impairment (e.g. based on an audiogram and a fitting rationale).

The estimate of the current open loop transfer function may be approximated by its magnitude, open loop gain.

The confidence criterion may comprise that the current estimate of a confidence level is above a threshold level in the frequency band k.

The confidence level $P_{th}$ may be frequency dependent ($P_{th}(k)$).

The confidence level estimator may be configured to provide that the current frequency dependent estimate of the confidence level of the current closed loop estimate of the feedback transfer function is further determined in dependence of one or more of a) the intended forward path transfer function, b) a style of the hearing aid, and c) characteristic of the at least one electric input signal.

The confidence level depends on the hearing aid, including the forward path, and especially the feedback control system. The confidence level may depend on how the feedback control (e.g. 'cancellation') system is configurated. So given a specific feedback control system, the confidence level can be predicted (e.g. by a deterministic dependency on system parameters). Alternatively, one can configure the hearing aid to learn/adapt the confidence level online (during use of the hearing aid), e.g. based on an initial estimation.

The term 'style of a hearing aid' is in the present context taken to mean the practical configuration, or partitioning in parts, of a hearing aid at or in or around an ear of the wearer. Examples of well-known hearing aid styles are (see e.g. [HA-styles]):

- Receiver-in-the-canal (RIC) or Receiver in the ear (RIE) hearing aid,
- In-the-ear hearing aid (ITE),
- In-the-canal hearing aid (ITC)
- Completely-in-the-canal hearing aid (CIC),
- Invisible-in-Canal hearing aid (IIC),
- Behind the ear hearing aid (BTE), where the term 'receiver' is synonym for loudspeaker (often used in connection with hearing aids). A choice of hearing aid style will typically depend on several factors, one being the degree of hearing loss, another being related to a degree of visibility of the hearing aid.

The characteristics of the at least one electric input signal may comprise, or be dominated by, one or more of white noise, coloured noise, speech, and music.

The confidence criterion in the frequency band k may be fulfilled if the current estimate of open loop gain is above a minimum value and below a maximum value.

The confidence criterion in the frequency band k may be fulfilled if the current (background) noise estimate is in a range above a minimum value and below a maximum value and if the current estimate of open loop gain is above a minimum value and below a maximum value.

The maximum value of the current noise estimate may be smaller than or equal to 65 dB SPL, and the minimum value of the current estimate of open loop gain may be larger than or equal to −40 dB.

The maximum value of the current noise estimate may be smaller than or equal to 90 dB SPL, and the minimum value of the current estimate of open loop gain may be larger than or equal to 0 dB.

The hearing aid may be configured to control processing in the hearing aid to assess a risk of acoustic feedback.

The hearing aid may be configured to control processing in the hearing aid to change the frequency dependent intended forward path transfer function, e.g. to control feedback.

The hearing aid may be configured to control processing in the hearing aid to change a parameter of the feedback control system, e.g. an adaptation rate of an adaptive algorithm of the feedback control system.

The hearing aid may be constituted by or comprise an air-conduction type hearing aid, a bone-conduction type hearing aid, a cochlear implant type hearing aid, or a combination thereof The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-)frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-)frequency domain)

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classification unit may be based on or comprise a neural network, e.g. a rained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path, but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid adapted to be worn by a user, or for being partially implanted in the head of the user is provided by the present disclosure. The hearing aid comprises a forward path comprising

- at least one input transducer for converting a sound to corresponding at least one electric input signals representing the sound, the sound comprising target signal components and background noise, a hearing aid processor for providing a processed signal in dependence of the at least one electric input signal, and an output transducer for providing stimuli perceivable as sound to the user in dependence of the processed signal.

The method may comprise one or more, such as a majority or all of providing by the forward path a frequency dependent intended forward path transfer function from the input transducer to the output transducer in dependence of the at least one electric input signal and of the user, k being a frequency band index, and providing a current frequency dependent closed loop estimate of a feedback path transfer function of a feedback path from the output transducer to the input transducer in a closed loop configuration of the forward path, and providing a current feedback path estimate in dependence of the current closed loop estimate of the feedback path transfer function and of the processed signal (U), subtracting the current feedback path estimate from a signal of the forward path to provide a feedback corrected signal, providing a frequency dependent estimate of a current open loop transfer function in dependence of the intended forward path transfer function and the current closed loop estimate of the feedback transfer function, and providing a current frequency dependent estimate of a confidence level of the current closed loop estimate of the feedback transfer function in dependence of the current estimate of open loop gain, and controlling processing in the hearing aid in a frequency band kin dependence of the current estimate of the open loop transfer function and/or the current closed loop estimate of the feedback path transfer function, if the current estimate of a confidence level fulfils a confidence criterion in the frequency band k.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The confidence criterion may comprise that the current estimate of a confidence level is above a threshold level in frequency band k.

The method may further comprise providing a current frequency dependent noise estimate ($\hat{N}(k)$) representing background noise in the at least one electric input signal, and providing said current frequency dependent estimate of a confidence level ($\hat{P}(k)$) of said current closed loop estimate ($\hat{H}$) of the feedback transfer function in dependence of said estimate of the current open loop transfer function ($\hat{L}(k)$) and said current noise estimate ($\hat{N}(k)$).

In a further aspect, a method of providing a reliable and accurate estimate of an open loop transfer function acquired in a closed loop setup of a hearing aid (e.g. without using probe noise) is provided, the method comprises:

Estimating a feedback path transfer function using an adaptive filter of an acoustic feedback control system in a closed loop setup;

Combining the estimate of the feedback path transfer function with a known hearing aid forward path transfer function to get open loop transfer function estimate;

Determining at which frequencies the estimated open loop transfer function is trustful and which can then be used for further processing in the hearing aid;

Applying the determined trustworthy open loop transfer function for an application in the hearing aid.

The method may comprise that the application in the hearing aid comprises assessing a risk of acoustic feedback and subsequent control of processing in the hearing aid in dependence of said assessment (e.g. amending a forward path transfer function, e.g. amending gain, or amending a parameter of a feedback control system, e.g. an adaptation rate).

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when the computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with the hearing aid or the hearing system.

Embodiments of the disclosure may e.g. be useful in applications such as assessing the risk of acoustic feedback and the control of a hearing aid.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1:
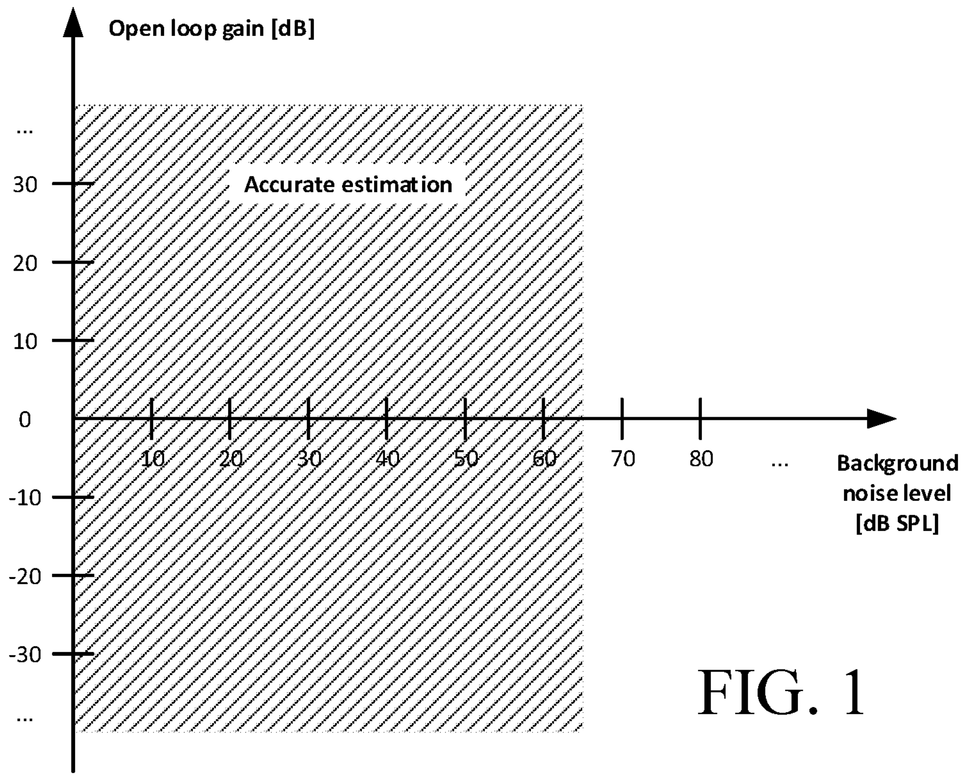
FIG. 1 illustrates that measuring in an open loop setup is dependent on the level of background noise and less dependent on the loop gain.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids. In the present disclosure, a procedure/algorithm to estimate/monitor the open loop transfer function in a hearing aid system based on its acoustic feedback cancellation system using adaptive filters is described.

The open loop transfer function estimate can be used for several applications, including control of hearing aids based on feedback risks and detection of correct placement of ear moulds, etc.

In case the open loop transfer function estimate indicates a high risk of feedback (e.g. with a view to the current forward transfer function, and/or the current feedback path estimate), some actions can be carried out, such as, To restrict the beamformer activities: beam patterns may/should be restricted in order to limit any further change of the forward path transfer function that would lead to a more critical open loop transfer function and hence even higher feedback risks. The restrictions can be slowing down and/or stopping the adaptations of beam patterns, or to enforce the beam pattern to one specific pattern that would give less feedback risks.

To control the noise reduction activities: the noise reduction system, and in particular how fast the noise reduction system releases the gain when applying noise reduction, can be restricted to a lower level.

To control the compression scheme: the hearing loss compression scheme can be restricted to provide less amplification and/or slower gain releasing in order to reduce feedback risks.

To control the feedback control system: the feedback control system can/should be configured to react and remove the feedback as quick as possible. This can be done by increase the adaptation speed of the adaptive algorithm for feedback cancellation.

All the above-mentioned activities can be applied at selected frequencies.

To estimate the open loop transfer function (OLTF), we need to know the forward path (FPTF) and feedback path (FBPTF) transfer functions. The forward path transfer function is known in a hearing aid application, whereas the feedback transfer function is unknown. An estimate of the feedback path transfer function can be obtained, though, using an adaptive filter from a feedback cancellation system in a hearing aid application.

Combining the two provides an estimate of the open loop transfer function, e.g. OLTF=FPTF+FBPTF, in a logarithmic representation. The estimation of the unknown feedback path using adaptive filters can be done in an open loop setup, or in a closed loop setup.

The feedback path estimation in an open loop setup using a probe signal (cf. e.g. FIG. 3A, 3B) is much easier to handle than in a closed loop setup without using probe signal (cf. e.g. FIG. 4A), and it generally provides much better accuracy, as the estimation condition is more under control. Feedback estimation in a closed loop, but including an added probe signal, may be used as a compromise (cf. e.g. FIG. 4B).

On the other hand, the estimation in a closed loop without using probe signal can be more preferable in a hearing aid application, as the measurement does not disturb hearing aid users at all, whereas the estimation in open loop using probe signal needs to replace the desired hearing aid output signal with an undesired (and, from a technical point of view, preferably loud) probe signal. This becomes especially annoying and even unacceptable if conducted as a continuous measurement.

As the preferred open loop transfer function estimate acquired in the closed loop without using probe noise can be inaccurate, we would prefer to determine when the estimate provides a reliable and accurate estimate before it can be used.

In the present disclosure, a procedure, with the following steps, to obtain and apply a reliable and accurate estimate of open loop transfer function acquired in a closed loop setup of a hearing aid without using probe noise is presented:

S1. Estimate feedback path transfer function using the adaptive filters from the acoustic feedback cancellation system in a closed loop setup;

S2. Combine the above estimate to the known hearing aid forward transfer function to get open loop transfer function estimate;

S3. Determine at which frequencies the estimated open loop transfer function is trustful and which can then be used for further processing;

S4. Apply the determined trustworthy open loop transfer function for an application in the hearing aid, e.g., processing, such as assessing the risk of acoustic feedback and subsequent control of processing in the hearing aid.

This procedure is slightly similar to procedures described in US20130170660A1 and EP2613567A1. A significant difference is provided by the above step S3, however.

An important difference to these disclosures is that we here estimate an open-loop transfer function in a closed-loop setup without using a probe signal. In the disclosures of US20130170660A1 and EP2613567A1, the feedback path was estimated, and mainly in an open-loop setup by using additional probe signals.

Closed-loop measurement without using probe signal has also been mentioned as an option in the disclosures of US20130170660A1 and EP2613567A1, without details on how to make them to work in a closed-loop setup, though. This is the part that is provided in step S3 of the above procedure. Without this important step, the estimation of open loop transfer function in a closed-loop setup without probe noise is NOT ALWAYS reliable and accurate, as illustrated below.

FIG. 1 shows Measuring in an open loop setup is dependent on the level of background noise and less dependent on the loop gain. FIG. 1 below shows that when measuring feedback path in an open loop setup using probe noise, a very important factor for its accuracy is the background noise, and it is more or less independent of open loop gain. For relatively low background noise level, typically below 60-70 dB SPL, an accurate estimate of the feedback path is possible over a wide range of open loop gain (e.g. between −50 dB and +50 dB) (given a reasonable measurement time, e.g. within few seconds).

A higher/lower background noise level would make the estimate less/more accurate, and this can be compensated by smaller/bigger step size in the adaptive algorithm. If we e.g. lower the step size by a factor of 2, we can allow 6 dB louder background noise and still have the same accuracy after the convergence, but the measurement would take twice the amount of time. A theoretical study is e.g. provided in [Guo et al., 2011].

Given a measurement time of few seconds, it turns out that we can accept a background noise level of 60-70 dB SPL to achieve our desired accuracy.

However, it is different when measuring feedback path in a closed loop without probe noise. It is therefore important to understand when the estimate is reliable and hence can be trusted.

Figure 2:
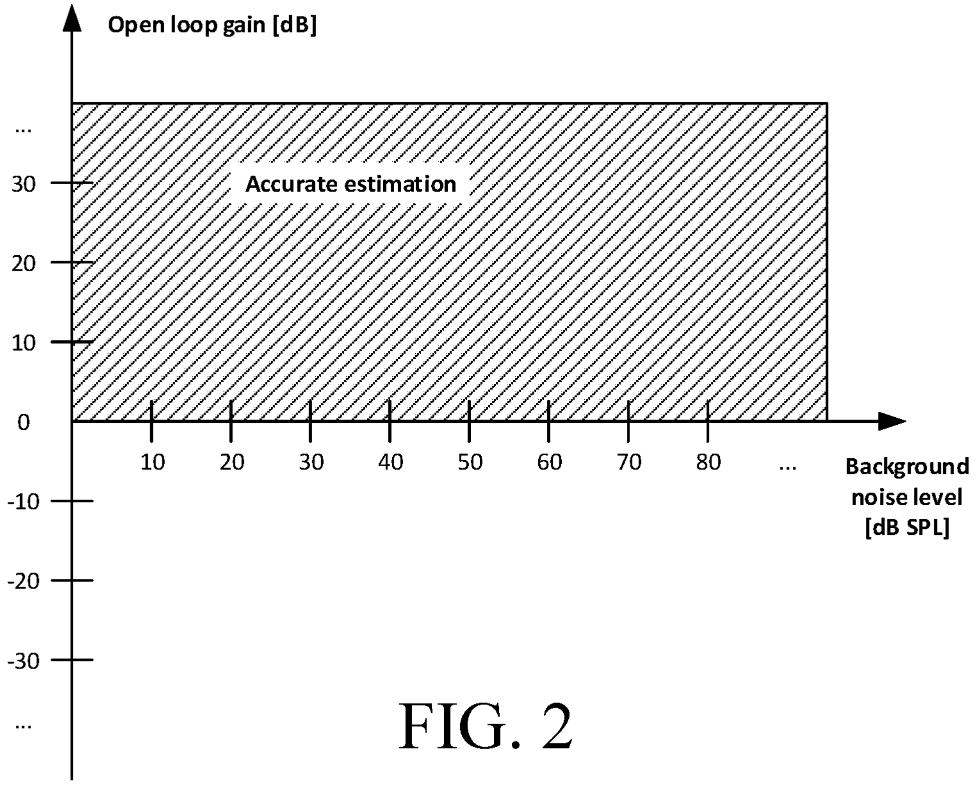
FIG. 2 illustrates that measuring in a closed loop setup is dependent on the loop gain and less dependent on the level of background noise.

FIG. 2 illustrates that measuring in a closed loop setup is dependent on the loop gain and less dependent on the level of background noise. FIG. 2 illustrates the measurement of feedback path is indeed highly dependent on the open loop gain, and it is accurate when the open loop gain is around and above 0 dB (given a reasonable measurement time, e.g. within few seconds), and it is practically speaking independent of background noise (e.g. preferably <100 dB SPL for audibility reason).

In other words, we can trust the feedback path estimate and hence the estimated loop gain when the loop gain estimate is indeed high.

When the loop gain is high enough, the feedback signal appears to be strong compared to the background noise (which is the input signal in this case), and hence a good feedback-to-noise ratio.

The background noise level (~65 dB) and open loop gain value (~0 dB) for getting accurate estimation in FIG. 1 and FIG. 2 can change, depending on the duration of the estimation. However, the dependency on background noise and loop gain would not change for measuring in open loop and closed loop setup.

This is the motivation behind the qualification/selection process in the above step 3, to determine which frequency regions the loop gain estimate is indeed high, and only in these regions the feedback path/open loop transfer function estimates can be used. After that, both the critical frequency information and the open loop gain estimates in these regions can then be used for further processing.

Based on the current forward transfer function and the worst-case forward transfer function, it is possible to compute the current/worst-case open loop transfer function estimates, which can then be used to assess the risk of feedback and/or the physical fit of hearing aids, hence to control the hearing aids, e.g.,

- Detection of obstacle close to ear/hearing aids, and hence to ensure the stability and audibility of hearing aids.
- Classification of bad physical fit, e.g., bad placement or "grown-out" ears, cf. e.g. US20130170660A1.
- All these can be combined with motion sensors to further control hearing aids.

Figure 3A:
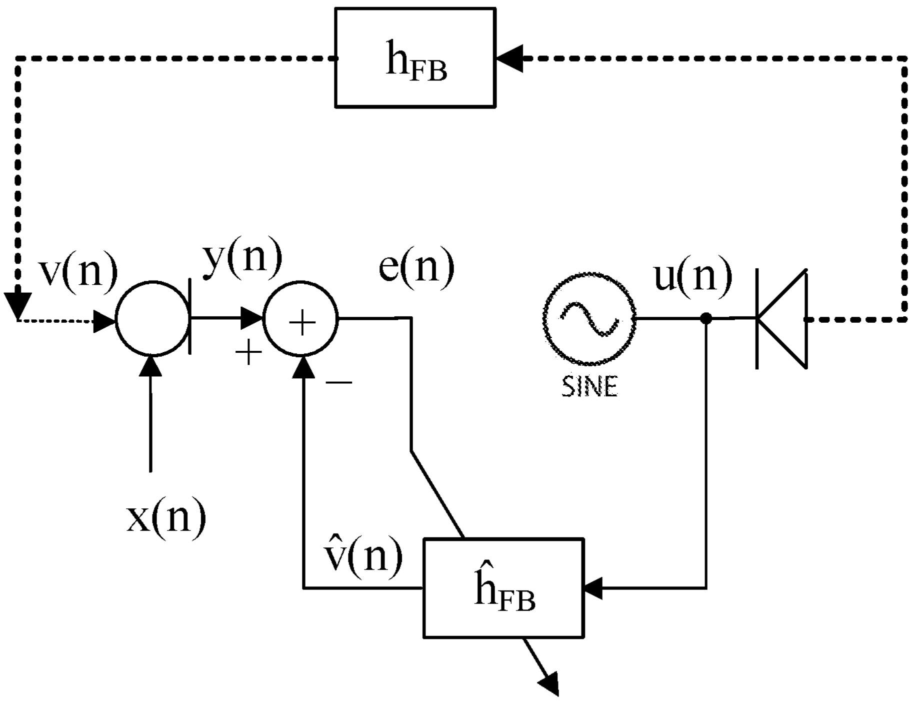
FIG. 3A shows a first embodiment of a block diagram for open loop feedback path estimation using a probe signal comprising one or more sine tones.
Figure 3B:
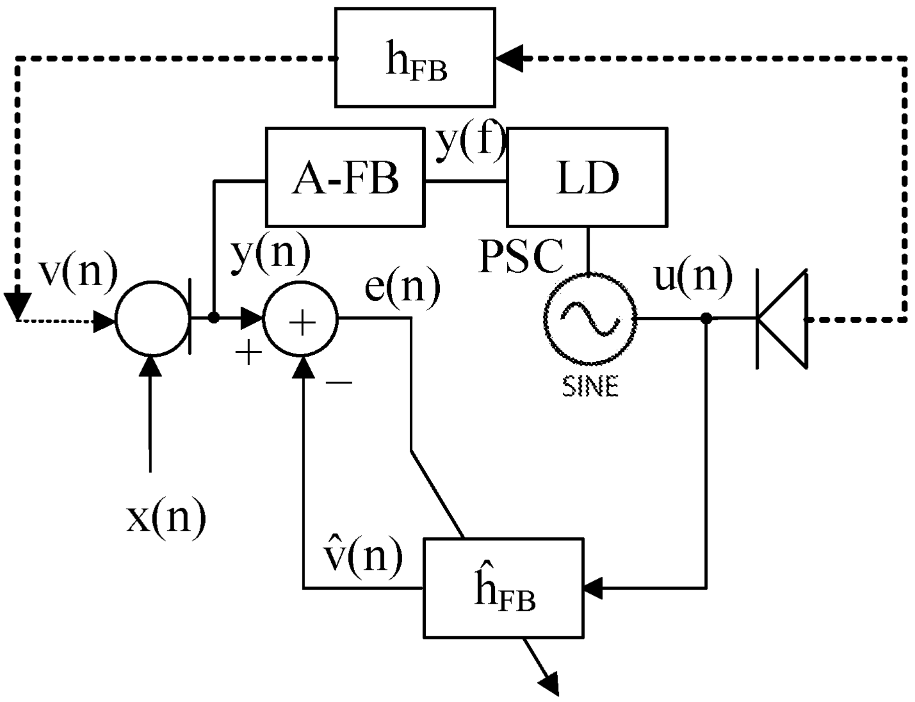
FIG. 3B shows a first embodiment of a block diagram for open loop feedback path estimation using a probe signal, wherein the probes signal generator is controlled by frequency sub-band levels of the band-split microphone signal (y(f))

FIG. 3A shows a first embodiment of a block diagram for open loop feedback path estimation using a probe signal comprising one or more sine tones, and FIG. 3B shows a first embodiment of a block diagram for open loop feedback path estimation using a probe signal, wherein the probes signal generator is controlled by frequency sub-band levels of the band-split microphone signal (y(f)).

FIG. 3A, 3B show a model for open loop feedback path estimation using a sine tone, where the adaptive filter $\hat{h}_{FB}$ is estimated from signals u(n) and e(n), where n is a time index related to a sampling rate ($f_s$) of the system ($1/f_s$ defining a time range). The loop is 'open' in the sense that the forward path (e.g. providing amplification in a closed loop configuration) is 'broken up'. A (fast) feedback path estimate can e.g. be obtained by playing a number of tones (e.g. a melody) at different frequencies (open loop feedback estimation). The listening device comprises (in a special open loop mode) a tone generator (SINE in FIG. 3A, 3B) for feeding a signal comprising the tone or tones to the loudspeaker (instead of the normal output signal from the signal processing unit (HAG in FIG. 4A, 4B, not shown in FIG. 3A, 3B). The listening device is adapted to switch the output signal u(n) to the tone generator in a particular mode of the listening device (e.g. as part of a start-up procedure, or at the request of a user, e.g. via a user interface, e.g. a remote control). This is particularly relevant for verifying an appropriate mounting of an ITE-part of a listening device for a (e.g. elderly) person needing assistance in such mounting, or for a deep in the ear canal type of listening device, where a proper mounting is difficult to verify for any person. The tones may be played one at a time or a few tones simultaneously, if the tones are well separated in frequency (e.g. more than 1 kHz apart). The tones are propagated along the feedback path and enter the microphone as feedback signal v(n) (possibly mixed with a (target) signal x(n) from the environment) and arrive in the listening device as electric input signal y(n). The feedback estimation filter $\hat{h}_{FB}$ can then—by minimizing error signal e(n)—rapidly adapt to the correct feedback path estimate value for the given frequencies (represented by the probe signal). These values may then be compared to a reference estimate of the feedback path stored in a memory of the listening device. The stored reference estimate may be slowly varying (updated over time) to comply with changes in the ear canal of the user (e.g. a child's growth). Alternatively, a stored reference estimate may be fixed, in cases where no substantial changes to the dimensions of the ear canal of the user are expected (e.g. for adult (e.g. elderly) people needing help to mount their listening device(s) by a caring person). If the values deviate too much (e.g. if the feedback deviation ($\Delta FB = FBE_{REF} - FBE_{CUR}$) is smaller than a predefined value, e.g. based on a sum of the deviations, $\Sigma[\Delta FB(f_T)]$, being smaller than a sum threshold value $\Delta_\Sigma FB_{THR}$, where the sum ($\Sigma$) is over the tones $f_T$ comprised in the probe signal), the ear mould is not correctly inserted, and a warning should inform a user (or observer) accordingly. The warning signal may comprise an acoustic, a visual or a mechanical (vibration) signal (or a mixture thereof) and the listening device may comprise corresponding signal generators controlled by a signal representative of the feedback deviation. The melody may be played in a loop (i.e. persist) for a certain predefined amount of time, or until it is detected that the mould of the listening device has been correctly mounted. In an embodiment, an information signal is issued after a user-initiated or after an automatically initiated measurement of current feedback based on a probe signal comprising a selected number of tones, in case it is concluded that the mould IS correctly mounted. The two embodiments shown in FIGS. 3A and 3B are nearly identical. The embodiment shown in FIG. 3B additionally comprises a level detector LD for providing a level of the input signal y(f) at different frequencies f. This is used as a control input PSC to the probe signal generator (here tone generator SINE) to adapt the level of the tones (or at least some of the tones) of the probe signal generator to the level of the input signal at the corresponding frequencies f. Alternatively or additionally, the duration of one or more tones may be adapted to the level of the input signal, e.g. by increasing the duration with increasing level. The listening device of FIG. 3B hence comprises an analysis filter bank A-FB for converting the time domain input signal y(n) to a frequency domain input signal y(f).

Figure 4A:
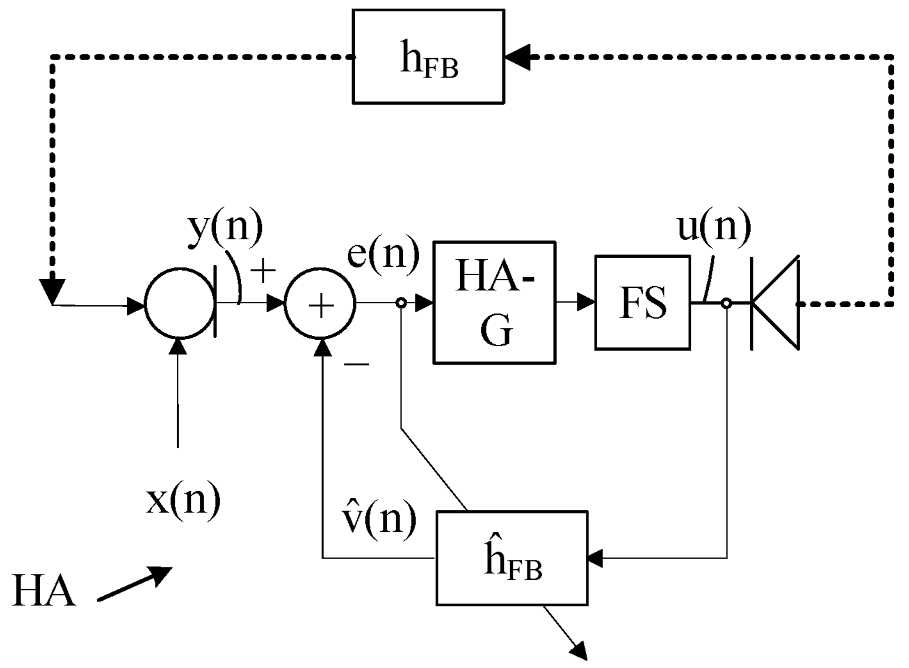
FIG. 4A shows a first embodiment of a block diagram for closed-loop feedback path estimation using frequency shift of the processed output signal.
Figure 4B:
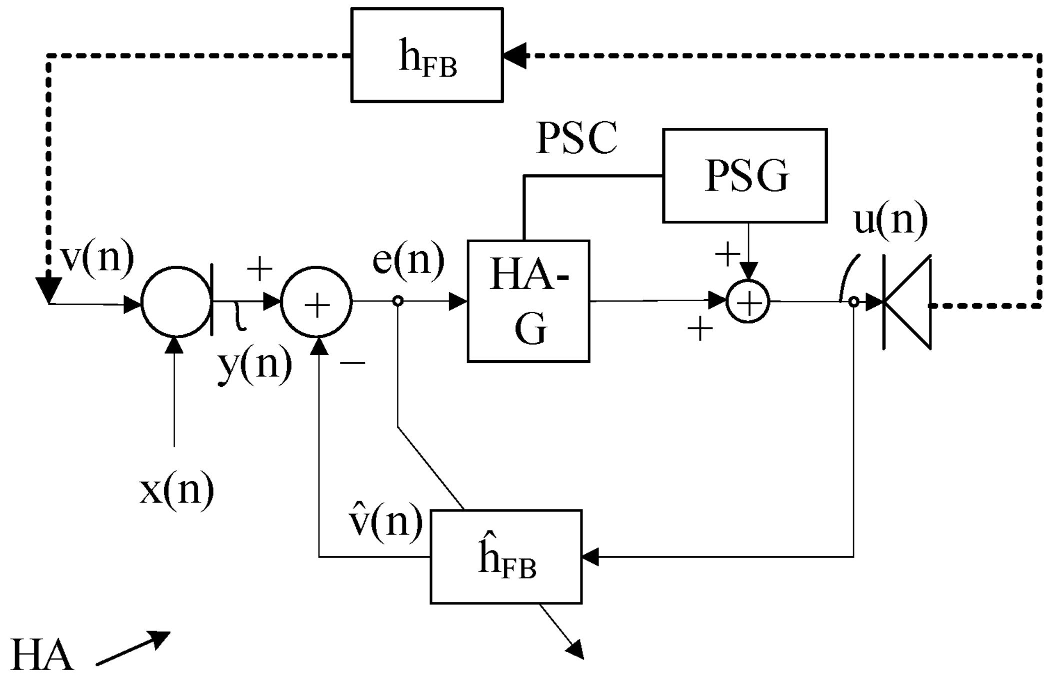
FIG. 4B shows a second embodiment of a block diagram for closed-loop feedback path estimation using the addition of a probe signal to the processed output signal.

FIG. 4A shows a first embodiment of a block diagram for closed-loop feedback path estimation using frequency shift of the processed output signal, and FIG. 4B shows a second embodiment of a block diagram for closed-loop feedback path estimation using the addition of a probe signal to the processed output signal.

Alternatively, the feedback estimation can be done using closed loop estimation. FIG. 4 shows a model for closed-loop feedback path estimation using frequency shift (FIG. 4A) and using the addition of a probe signal without frequency shift (FIG. 4B). In the embodiments of a listening device shown in FIG. 4A, 4B, HA-G represents the forward path gain and (in FIG. 4A) FS is a frequency shift block for applying a (preferably inaudible) frequency shift to the output signal. In FIG. 4B, PSG is a probe signal generator for providing a probe signal (see e.g. WO2009007245A1), which is added to the output signal from the processing unit HA-G to decrease correlation between input and output signal of the forward path of the listening device. A decrease in correlation may be achieved by any relevant measure, including frequency dependent delay, phase or frequency modification, etc. (in FIG. 4A, frequency shift is used). The probe signal generator PSG (including its activation) is controlled by the signal processing unit HA-G via control signal PSC. The feedback path $h_{FB}$ is estimated by the feedback estimation unit (adaptive filter) $\hat{h}_{FB}$ based on the frequency shifted output signal u(n) (FIG. 4A) and the output signal u(n) comprising a probe signal (FIG. 4B), respectively.

In the estimation model shown in FIG. 4A the feedback estimation relies on external sounds x(n) that are combined with the feedback signal v(n) resulting in (electric) microphone signal y(n). In the estimation model shown in FIG. 4B a (preferably inaudible) probe signal is added to the output signal (here, no frequency shift is applied when the probe signal is added; alternatively, a frequency shift may applied to the combined output signal). In either case of the closed loop estimation, external sounds x(n) are audible, but the estimation is typically slower than in the open loop estimation of FIG. 3A, 3B. An advantage of the closed loop estimation is that it can be performed during normal operation of the listening device.

Figure 5:
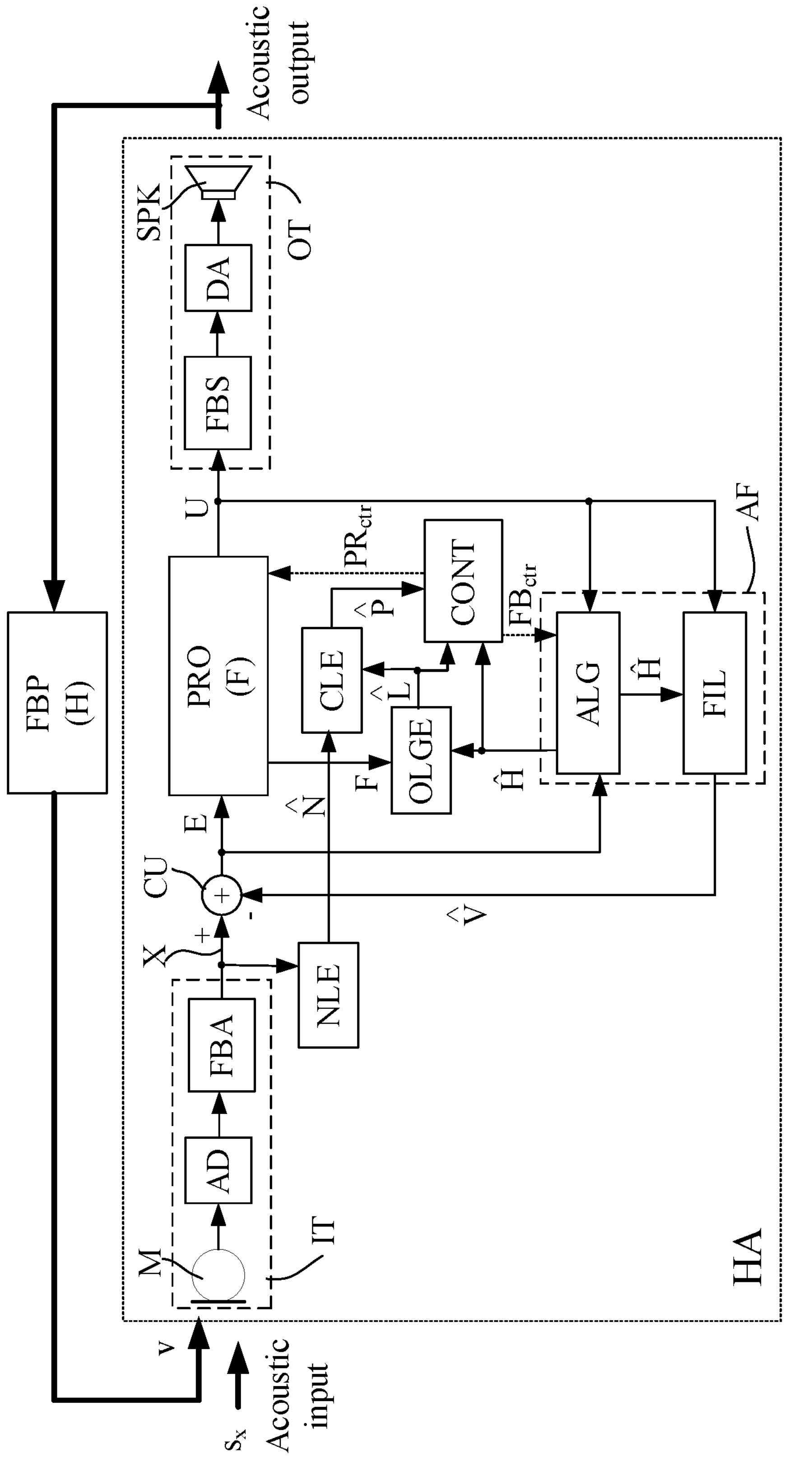
FIG. 5 shows an embodiment of hearing aid according to the present disclosure.

FIG. 5 shows an embodiment of hearing aid according to the present disclosure. The hearing aid (HA) may be adapted to be worn by a user. The hearing aid may be partially or fully implanted in the head of the user, e.g. in case of a bone conducting hearing aid, etc. The hearing aid comprises a forward path. In the embodiment of FIG. 5, the forward path comprises an input transducer (IT) for converting a sound to a corresponding electric input signal (X) representing the sound. The input transducer (IT) may e.g. comprise a microphone (M). The sound may e.g. comprise target signal components (e.g. speech or other sound bits of the user's current interest) and background noise (e.g. non-speech components or other sound that is not or the user's current interest). In some situations, speech components and non-speech components can be seen as the background noise, for the adaptive filter estimation. The acoustic input signal (denoted 'Acoustic input' in FIG. 5) may comprise an external part (denoted '$S_x$' in FIG. 5) and a feedback part (denoted 'v' in FIG. 5). The forward path further comprises a hearing aid processor (PRO) for providing a processed signal (U) in dependence of the electric input signal (X) or a signal originating therefrom (here feedback corrected signal E) and for providing a processed output signal (U) in dependence thereof. The forward path further comprises an output transducer (OT) for providing stimuli perceivable as sound to the user in dependence of the processed signal (U). The output transducer may e.g. comprise a loudspeaker (SPK) for converting electric stimuli to acoustic vibrations in air. The output transducer may e.g. comprise a vibrator for converting electric stimuli to acoustic vibrations in skull bone and tissue. The input (IT) and output (OT) transducers may (as in FIG. 5) comprise appropriate analogue to digital converters (AD) and/or digital to analogue converters (DA) as appropriate to allow signals to be processed in the hearing aid as digital samples. The input (IT) and output (OT) transducers may (as in FIG. 5) comprise appropriate analysis and synthesis filter banks (FBA and FBS, respectively) as appropriate to allow signals to be processed in the hearing aid in the (time-)frequency domain (k, l) (e.g. as frequency sub-band signals), where k and l are frequency and time indices, respectively. Possible analysis and synthesis filter banks (FBA and FBS, respectively) may form part of a processor (e.g. a digital signal processor, of the hearing aid). The forward path is configured to provide a frequency dependent intended forward path transfer function (F) from the input transducer to the output transducer in dependence of the at least one electric input signal X (or a signal derived therefrom) and in dependence of the user (e.g. of a hearing impairment of the user, e.g. as mapped by a hearing profile, e.g. an audiogram).

The hearing aid (HA) further comprises a feedback control system comprising a feedback path estimator (AF), e.g. comprising an adaptive filter connected to signals (E, U) of the forward path. The adaptive filter may comprise an adaptive algorithm part (ALG) and a variable filter part (FIL). The algorithm part (ALG) is configured to provide a current frequency dependent estimate ($\hat{H}$(k, l)) of a feedback path transfer function (H) of a feedback path from the output transducer to the input transducer in a closed loop configuration including the forward path. The estimate ($\hat{H}$) of a feedback path transfer function (H) is e.g. provided as filter coefficients ($\hat{H}$) configured to be applied to the variable filter part (FIL). The variable filter part (FIL) is configured to provide an estimate ($\hat{V}$) of the feedback path in dependence of the current estimate ($\hat{H}$, or a modified version thereof) of the feedback path transfer function and of said processed signal (U). The feedback control system further comprises a combination unit (CU), e.g. an adder ('+') in the forward path configured to subtract the current feedback path estimate ($\hat{V}$) from a signal of the forward path (here electric input signal X) to provide a feedback corrected signal (E), which is fed to the hearing aid processor (PRO) and to the algorithm part of the feedback path estimator (AF). The hearing aid (HA) further comprises a background noise estimator (NLE) configured to provide a current frequency dependent background noise level estimate ($\hat{N}$(k, l)) representing a level (or a parameter dependent thereof, e.g. an average thereof) of at least one electric input signal (X(k, l) or in a processed version thereof. In other words, the input signal of the background noise estimator (NLE) can be taken from other places in the forward path, e.g., using feedback corrected signal (E) instead (or both, e.g. X and E), or some background noise estimates within the processor block (PRO), etc. The hearing aid (HA) further comprises an open loop gain estimator (OLGE) connected to the hearing aid processor (PRO) and to the feedback path estimator (AF). The open loop gain estimator (OLGE) is configured to provide a frequency dependent estimate $\hat{L}$(k, l) of a current open loop transfer function in dependence of the intended forward path transfer function (F(k, l)) and the current estimate ($\hat{H}$(k, l)) of the feedback transfer function. The hearing aid (HA) further comprises a confidence level estimator (CLE) connected to the noise estimator (NLE) and to the open loop gain estimator (OLGE). The confidence level estimator (CLE) is configured to provide a current frequency dependent estimate of a confidence level ($\hat{P}$(k, l)) of the current estimate ($\hat{H}$(k, l)) of the feedback path transfer function in dependence of the estimate (|$\hat{L}$(k)|) of current loop gain and the current (background) noise estimate ($\hat{N}$(k, l)). The confidence level estimator (CLE) may further receive an input from the hearing aid processor (PRO) (to make use of the intended forward gain (|F|, cf. dotted arrow from PRO to CLE), and possibly a knowledge of the hearing aid style, e.g. functional details of an earpiece, etc.). The confidence level estimate ($\hat{P}$(k, l)) may be based solely on the estimate (|$\hat{L}$(k)|) of current loop gain, in which case the noise estimator (NLE) can be dispensed with (at least for this purpose). The hearing aid (HA) may further comprise a controller (CONT) configured to control the hearing aid in dependence of the current estimate ($\hat{H}$(k, l)) of the feedback transfer function and/or of the current estimate ($\hat{L}$(k, l)) of the open loop transfer function if said current estimate ($\hat{P}$(k, l)) of the confidence level fulfils a criterion, e.g. that it is above a threshold level ($P_{th}$(k)). The confidence level may be frequency dependent (as indicated by dependency of k in $P_{th}(k)$). The confidence level $P_{th}$ may, however, be the same over frequency.

The controller (CONT) may e.g. be configured to control the use of a current estimate ($\hat{H}(k, l)$) of the feedback path transfer function in frequency bands k that fulfill the (confidence level) criterion (e.g. that the confidence level ($\hat{P}(k, l')$) is above a threshold level ($P_{th}(k)$) at a given point in time l' (cf. signal $FB_{ctr}$ (and dotted arrow) to the feedback path estimator (AF), here specifically to the algorithm part (ALG) of the adaptive filter). The current estimate ($\hat{H}(k, l)$) of the feedback path transfer function in frequency bands k for which the (confidence level) criterion is not fulfilled may e.g. be left unchanged (i.e. $\hat{H}(k, l')=\hat{H}(k, l'-1)$, if $\hat{P}(k, l')<P_{th}(k)$). The time index l(l') may e.g. represent a time frame index (or a multiple thereof).

The controller (CONT) may e.g. be configured to use a current estimate ($\hat{H}(k, l)$) in the control of other functionality of the hearing aid, e.g. via the hearing aid processor (PRO), cf. signal $PR_{ctr}$ (and dotted arrow) to the processor (PRO). The current estimate ($\hat{H}(k, l)$) may e.g. be compared to a reference value $H_{ref}(k)$ and based thereon (and possibly on knowledge about the hearing aid style), it may be concluded that the hearing aid is not correctly mounted (e.g. indicating an extraordinary leakage of sound from the output transducer to the input transducer(s). This may e.g. result in an alarm being issued, e.g. via a user interface (e.g. implemented as ab APP of a smartphone).

The current estimate ($\hat{H}(k, l)$) may e.g. be compared to the current gain in the forward path (F), to evaluate if the gain is at risk to be reduced or the output sound is at risk to be distorted due to feedback issues.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

US20130170660A1 (Oticon) Jul. 4, 2013
EP2613567A1 (Oticon) Jul. 10, 2013
WO2009007245A1 (Oticon) Jan. 15, 2009
[Guo et al.; 2011] Meng Guo; Thomas Bo Elmedyb; Søren Holdt Jensen; Jesper Jensen, 'Analysis of Acoustic Feedback/Echo Cancellation in Multiple-Microphone and Single-Loudspeaker Systems Using a Power Transfer Function Method', IEEE Transactions on Signal Processing, Volume: 59, Issue: 12, December 2011, pp. 5774-5788.
[HA-styles] https://advancedhearingcare.org/hearing-aid-styles.

The invention claimed is:

1. A hearing aid adapted to be worn by a user, or for being partially or fully implanted in the head of the user, comprising a forward path comprising at least one input transducer for converting a sound to corresponding at least one electric input signals representing said sound, the sound comprising target signal components and background noise, a hearing aid processor for providing a processed signal (U) in dependence of said at least one electric input signal, and an output transducer for providing stimuli perceivable as sound to the user in dependence of said processed signal, wherein the forward path is configured to provide a frequency dependent intended forward path transfer function (F(k)) from said input transducer to said output transducer in dependence of said at least one electric input signal and of a hearing impairment of said user, k being a frequency band index, and wherein the hearing aid further comprises a feedback control system comprising a feedback path estimator configured to provide a current frequency dependent closed loop estimate ($\hat{H}(k)$) of a feedback path transfer function (H) of a feedback path from said output transducer to said input transducer in a closed loop configuration of the forward path, and a current feedback signal estimate ($\hat{V}$) in dependence of said current closed loop estimate ($\hat{H}(k)$) of the feedback path transfer function and of said processed signal (U), a combination unit in the forward path configured to subtract said current feedback path estimate ($\hat{V}$) from a signal of the forward path to provide a feedback corrected signal (E), an open loop transfer function estimator configured to provide a frequency dependent estimate ($\hat{L}(k)$) of a current open loop transfer function in dependence of said intended forward path transfer function (F(k)) and said current closed loop estimate ($\hat{H}(k)$) of the feedback transfer function,

- a confidence level estimator configured to provide a current frequency dependent estimate of a confidence level ($\hat{P}(k)$) of said current closed loop estimate ($\hat{H}$) of the feedback transfer function in dependence of the estimate of the current open loop transfer function ($\hat{L}(k)$), and
- a noise estimator configured to provide a current frequency dependent noise estimate ($\hat{N}(k)$) representing a background noise level in the at least one electric input signal, and wherein said confidence level estimator is configured to provide said current frequency dependent estimate of a confidence level ($\hat{P}(k)$) of said current closed loop estimate ($\hat{H}$) of the feedback transfer function in dependence of said estimate of the current open loop transfer function ($\hat{L}(k)$) and said current noise estimate ($\hat{N}(k)$), wherein the hearing aid is configured to control processing in the hearing aid in a frequency band k in dependence of said estimate ($\hat{L}(k)$) of the current open loop transfer function, if said current estimate ($\hat{P}(k)$) of a confidence level fulfils a confidence criterion in said frequency band k.

2. A hearing aid according to claim 1 wherein the estimate ($\hat{L}(k)$) of the current open loop transfer function is approximated by its magnitude, open loop gain ($|\hat{L}(k)|$).

3. A hearing aid according to claim 1 wherein said confidence criterion comprises that said current estimate ($\hat{P}(k)$) of a confidence level is above a threshold level ($P_{th}$) in said frequency band k.

4. A hearing aid according to claim 1 wherein the confidence level $P_{th}$ is frequency dependent ($P_{th}(k)$).

5. A hearing aid according to claim 1 wherein the confidence level estimator (CLE) is configured to provide that said current frequency dependent estimate of the confidence level ($\hat{P}(k)$) of said current closed loop estimate ($\hat{H}$) of the feedback transfer function is further determined in dependence of one or more of a) the intended forward path transfer function (F(k)), b) whether the hearing aid is a receiver-in-the-canal (RIC), a receiver-in-the-ear (RIE), an in-the-ear (ITE) hearing aid, a completely-in-the-canal (CIC), invisible-in-canal (IIC), or behind-the-ear (BTE) hearing aid, and c) a characteristic of the at least one electric input signal.

6. A hearing aid according to claim 5 wherein the characteristics of the at least one electric input signal comprises, or is dominated by, one or more of white noise, coloured noise, speech, and music.

7. A hearing aid according to claim 1 wherein said confidence criterion in said frequency band k is fulfilled if said estimate of current open loop gain ($|\hat{L}(k)$) is above a minimum value and below a maximum value.

8. A hearing aid according to claim 7 wherein said confidence criterion in said frequency band k is fulfilled if a current noise estimate ($\hat{N}(k)$) is in a range above a minimum value and below a maximum value.

9. A hearing aid according to claim 8 wherein said maximum value of said current noise estimate ($\hat{N}(k)$) is smaller than or equal to 65 dB SPL, and said minimum value of said estimate of current open loop gain ($|\hat{L}(k)|$) is larger than or equal to −40 dB.

10. A hearing aid according to claim 8 or wherein said maximum value of said current noise estimate ($\hat{N}(k)$) is smaller than or equal to 90 dB SPL, and said minimum value of said estimate of current open loop gain ($|\hat{L}(k)|$) is larger than or equal to 0 dB.

11. A hearing aid according to claim 1 wherein said control of processing in the hearing aid comprises assessing a risk of acoustic feedback.

12. A hearing aid according to claim 1 wherein said control of processing in the hearing aid comprises changing the frequency dependent intended forward path transfer function, e.g. to control feedback.

13. A hearing aid according to claim 1 wherein said control of processing in the hearing aid comprises changing a parameter of the feedback control system, e.g. an adaptation rate of an adaptive algorithm of the feedback control system.

14. A hearing aid according to claim 1 being constituted by or comprising an air-conduction type hearing aid, a bone-conduction type hearing aid, a cochlear implant type hearing aid, or a combination thereof.

15. Use of a hearing aid as claimed in claim 1.

16. A method of operating a hearing aid adapted to be worn by a user, or for being partially or fully implanted in the head of the user, the hearing aid comprising a forward path comprising

- at least one input transducer for converting a sound to corresponding at least one electric input signals representing said sound, the sound comprising target signal components and background noise,
- a hearing aid processor for providing a processed signal (U) in dependence of said at least one electric input signal, and
- an output transducer for providing stimuli perceivable as sound to the user in dependence of said processed signal, the method comprising

- providing by the forward path a frequency dependent intended forward path transfer function (F(k)) from said input transducer to said output transducer in dependence of said at least one electric input signal and of said user, k being a frequency band index, and
- providing a current frequency dependent closed loop estimate ($\hat{H}(k)$) of a feedback path transfer function (H) of a feedback path from said output transducer to said input transducer in a closed loop configuration of the forward path, and
- providing a current feedback path estimate ($\hat{V}$) in dependence of said current closed loop estimate ($\hat{H}(k)$) of the feedback path transfer function and of said processed signal (U),
- subtracting said current feedback path estimate ($\hat{V}$) from a signal of the forward path to provide a feedback corrected signal (E),
- providing a frequency dependent estimate ($\hat{L}(k)$) of a current open loop transfer function in dependence of said intended forward path transfer function (F(k)) and said current closed loop estimate ($\hat{H}(k)$) of the feedback transfer function,
- providing a current frequency dependent estimate of a confidence level ($\hat{P}(k)$) of said current closed loop estimate ($\hat{H}$) of the feedback transfer function in dependence of the estimate of the current open loop transfer function ($\hat{L}(k)$),
- controlling processing in the hearing aid in a frequency band k in dependence of said estimate ($\hat{L}(k)$) of the current open loop transfer function, if said current estimate ($\hat{P}(k)$) of a confidence level fulfils a confidence criterion in said frequency band k,
- providing a current frequency dependent noise estimate ($\hat{N}(k)$) representing background noise in the at least one electric input signal, and
- providing said current frequency dependent estimate of a confidence level ($\hat{P}(k)$) of said current closed loop estimate ($\hat{H}$) of the feedback transfer function in dependence of said estimate of the current open loop transfer function ($\hat{L}(k)$) and said current noise estimate ($\tilde{N}(k)$).

17. A method according to claim 16 wherein said confidence criterion comprises that said current estimate ($\hat{P}(k')$) of a confidence level is above a threshold level ($P_{th}$) in said frequency band k.

18. A data processing system comprising a processor and program code means for causing the processor to perform the method of claim 16.

19. A non-transitory computer readable medium storing a computer program comprising instructions which, when the program is executed by a computer, cause the computer to carry out the method of claim 16.

20. A method of providing a reliable and accurate estimate of an open loop transfer function acquired in a closed loop setup of a hearing aid without using probe noise, the method comprising:

Estimating a feedback path transfer function using an adaptive filter of an acoustic feedback control system in a closed loop setup;

Combining the estimate of the feedback path transfer function with a known hearing aid forward path transfer function to get open loop transfer function estimate;

Determining at which frequencies the estimated open loop transfer function is trustful and which can then be used for further processing in the hearing aid;

Applying the determined trustworthy open loop transfer function for an application in the hearing aid;

Providing a current frequency dependent noise estimate representing background noise in at least one electric input signal from at least one input transducer of the hearing aid; and Providing a current frequency dependent estimate of a confidence level of a current closed loop estimate of the feedback transfer function in dependence of said estimate of the current open loop transfer function and said current noise estimate.

21. A method according to claim 20 wherein said application in the hearing aid comprises assessing a risk of acoustic feedback and subsequent control of processing in the hearing aid in dependence of said assessment.

* * * * *